June 27, 1939.  J. A. GIBBONS  2,164,205
CABLE TROLLEY
Filed Jan. 14, 1938
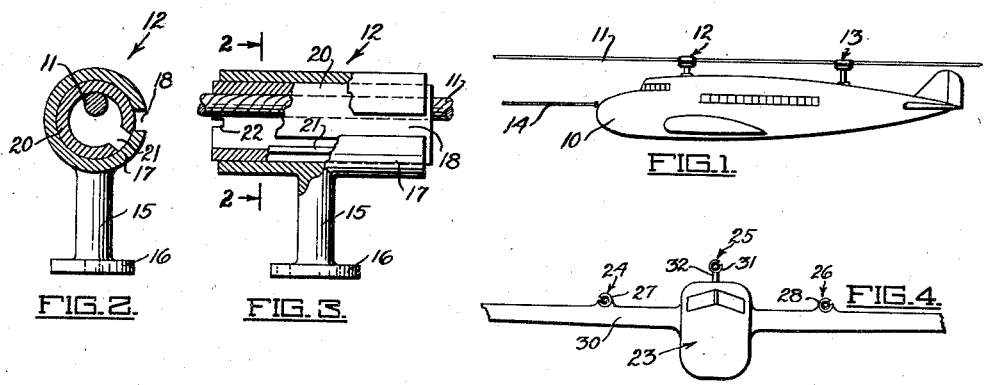
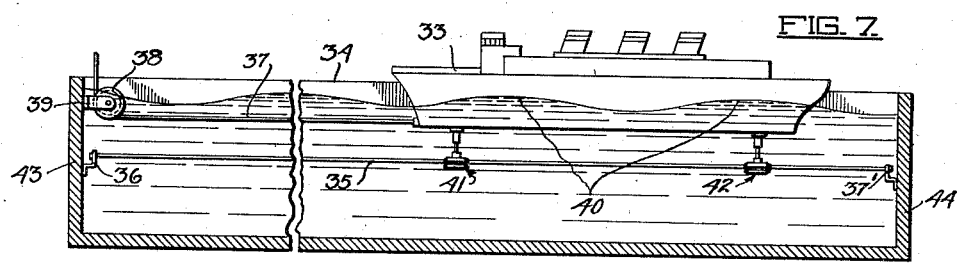
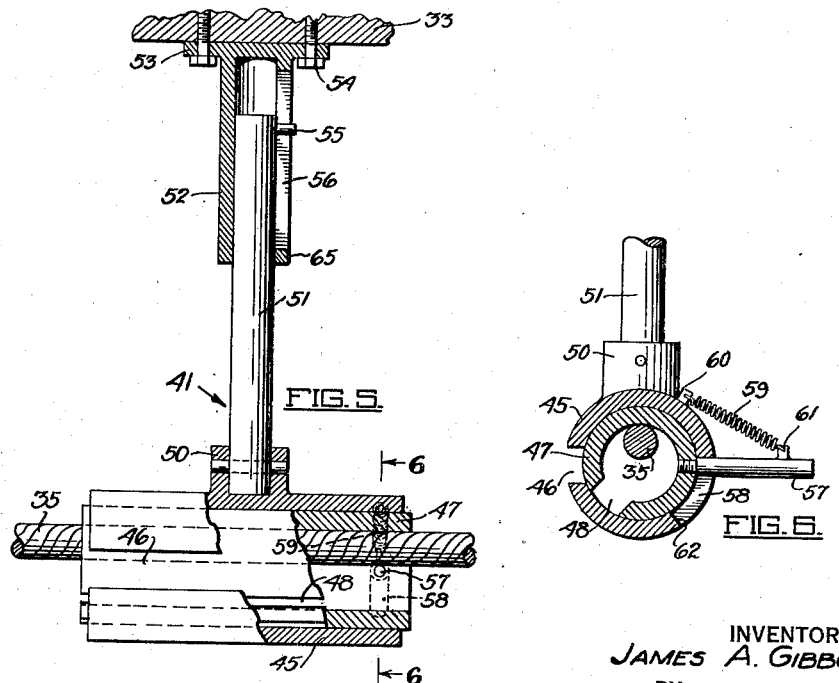
INVENTOR
JAMES A. GIBBONS
BY
ATTORNEY Patented June 27, 1939

2,164,205

UNITED STATES PATENT OFFICE 2,164,205

CABLE TROLLEY

James A. Gibbons, North Hollywood, Calif., assignor to Warner Bros. Pictures, Inc., New York, N. Y., a corporation of Delaware Application January 14, 1938, Serial No. 185,004

12 Claims. (Cl. 104—112)

This invention relates to cable trolleys or travellers for guiding objects along a cable and has particular reference to trolleys for guiding and/or carrying miniature or model airplanes, submarines, boats, etc. along cables to simulate actual travel of a full sized counterpart of such miniature.

In motion picture photography, miniature moving objects such as vehicles and the like are often employed instead of full sized objects either to effect economy, or to produce effects which would be otherwise impossible. Usually a motion picture is taken while the miniature is moving in front of a scene or set having a size in proper proportion to the miniature. Generally, in order to provide the desired direction of movement of the miniature, it is guided along a cable or cables extending in the path of movement of such miniature. These cables are generally fixed at both ends thereof to suitable supports.

It is often necessary to remove the miniature from the cable for adjustment or repairs, or to substitute a different miniature therefor.

The present invention obviates the necessity of detaching the guide cable or cables from it or their supports to remove the miniature and has for an object to quickly connect or disconnect the miniature to or from a guide cable for a guiding movement of the miniature.

Another object of the invention is to disguise a cable trolley as a part of the miniature guided thereby.

Another object is to guide a miniature along a substantially stationary cable while permitting a movement characteristic of the object such as the pitching or rolling of a ship.

Another object is to provide a compact and easily manufactured cable trolley.

The manner in which the above and other objects of the invention are accomplished will be apparent from the following specification read in conjunction with the accompanying drawing wherein:

Fig. 1 is a side elevational view of a miniature airplane illustrating one form of cable trolley and cable suspension.

Fig. 2 is a transverse sectional view of one of the cable trolleys illustrated in Fig. 1 and is taken along the line 2—2 of Fig. 3.

Fig. 3 is a side view with parts in section of the cable trolley illustrated in Fig. 2.

Fig. 4 is an elevational view, partly broken away of a miniature airplane illustrating an alternative form of cable trolley and cable suspension.

Fig. 5 is a side elevational view, with parts in section, of a cable trolley for guiding a miniature boat along a cable, while permitting a pitching and rolling movement of the boat.

Fig. 6 is a transverse sectional view taken along the line 6—6 of Fig. 5.

Fig. 7 is a sectional view of an arrangement for moving a miniature boat along a guide cable.

Fig. 1 illustrates one arrangement for guiding a miniature airplane 10 which is suspended from a guide cable 11 by a pair of spaced trolleys 12 and 13. In this case, the trolleys 12 and 13 are secured to the upper surface of the fuselage of the airplane in vertical alignment with the center of gravity of the airplane. Cable 11 is preferably of very small diameter and painted black or a similar color to render it invisible or non-actinic as viewed by the motion picture camera. The cable 11 is stretched in any suitable manner between two fixed supports (not shown) to render it taut and may be tilted at an angle to permit the plane 10 to slide there along by the action of gravity, or it may be supported in a horizontal position, in which case it is drawn by a similarly invisible or non-actinic tow cable 14. This type of cable suspension arrangement is particularly adapted to guide relatively large miniatures wherein the size of the miniature is so large in proportion to the size of the trolleys 12 and 13 that these trolleys are not noticeable.

One of the cable trolleys (12) is shown in Figs. 2 and 3 and each comprises a short vertical column 15 having a base 16 formed thereon whereby the trolley may be secured to the upper surface of the miniature airplane 10. A cylindrical sleeve member 17 is integrally formed on the top of column 15 and has a longitudinally extending slot 18 formed along the entire length thereof, which slot is of sufficient width to permit the guide cable 11 to pass transversely therethrough. A second cylindrical sleeve 20 is closely fitted within the bore of the outer sleeve 17 and also has a longitudinally extending slot 21 formed along the entire length thereof of a width the same as that of 18. Preferably a sufficient amount of friction exists between the inner and outer sleeves 17 and 20 to permit the sleeve 20 to remain in any set position. When it is desired to connect or disconnect the trolley to or from the cable 11, the inner sleeve 20 is rotated until the two slots 18 and 21 are aligned, whereby the cable 11 may be passed transversely through the two slots 18 and 21. For convenience in rotating the inner sleeve 20, a notch 22 may be formed at one end of the inner sleeve 20 to permit a screw driver or other suitable tool, to be engaged therein.

Fig. 4 illustrates an alternative form of cable guiding and suspension arrangement for a miniature airplane 23. This arrangement is particularly useful for very small miniatures where the cable trolleys 12 and 13 of Fig. 1 would be noticeable. In this case three laterally spaced parallel guide cables are employed. Cable trolleys 24, 25 and 26, each connected to one of the spaced guide cables, are formed on the wing and tail of the airplane 23 as illustrated and are disguised as lights. Each of these trolleys 24, 25 and 26 has an inner and an outer cylindrical sleeve and a slot therein similar to that shown in Figs. 2 and 3. The outer cylindrical sleeves 27 and 28 of the trolleys 24 and 26, respectively, are secured to and faired into the wing 30 of the airplane 23 to simulate the wing lights of the airplane. The outer cylindrical sleeve 31 of the trolley 25 is secured to and faired into the upper tip of the tail 32 of the airplane 23 to simulate the tail light thereof. As in the illustration of Fig. 1 the miniature 23 may be moved along the three guide cables by a tow cable or other suitable means not shown.

Fig. 7 illustrates an arrangement for moving a miniature ship 33 through a tank of water 34. The miniature 33 is guided in a predetermined path by means of a horizontal guide cable 35 situated below the bottom of the ship 33 and secured at 36 and 37' to the ends 43 and 44 of the tank 34. A tow cable 37 is secured at one end to the bow of the miniature 33 and lies below the level of the water in tank 34. The other end of the cable 37 is passed around a pulley 38 rotatably journalled in a bracket 39 secured to the end 43 of the tank 34. The cable 37 may be moved by any suitable motive means such as a motor and winding drum, in the case of models 10 or 12 feet long and weighing several hundred pounds, or by hand for smaller models. Paddles or other agitating means such as a wave machine (not shown) may be provided to form waves 40 in the water in tank 34 causing the miniature 33 to pitch and roll in a natural manner. Cable trolleys 41 and 42 depending from either end of miniature 33 are provided to guide the miniature along the cable 35. One of these trolleys (41) is illustrated in Figs. 5 and 6 and comprises a cylindrical sleeve 45 having a longitudinal slot 46 therein extending the entire length thereof. A second cylindrical sleeve 47 is loosely fitted within the bore of the sleeve 45 and also has a longitudinal slot 48 therein extending the entire length thereof. Slots 46 and 48 are of sufficient width to permit the cable 35 to be passed transversely therethrough. The outer sleeve 45 has an apertured boss 50 formed integrally thereon in which is secured the lower end of a plunger rod 51. The upper end of rod 51 is slidable within a cylinder 52. A flange 53 formed at the upper end of cylinder 52 is secured to the bottom portion of the miniature ship 33 by bolts 54. A transversely extending pin 55 provided at the upper end of the plunger rod 51 rides within a vertically extending slot 56 formed within the cylinder 52 to retain the cylindrical member 45 in parallel alignment with the miniature 33 at all times while preventing the rod 51 from being withdrawn from the cylinder 52, as the bottom of this slot is closed at 65.

A handle 57 (Fig. 6) is threadably secured at one end thereof to the inner cylindrical sleeve 47 adjacent one end thereof and extends through a slot 58 formed in the outer sleeve 45. A tension spring 59 is secured between bosses 60 and 61 formed on the sleeve 45 and handle 57, respectively, to normally retain the sleeve 47 in such an angular position relative to the sleeve 45 that the slots 46 and 48 are disaligned. The bottom 62 of the slot 58 is so positioned relative to the handle 57 that when handle 57 is moved into engagement therewith against the action of the spring 59, the slots 46 and 48 will be in exact alignment with each other thereby obviating the necessity of visually aligning these two slots when the cable 35 is to be connected or disconnected from the trolley. Slot 58 also serves to prevent longitudinal movement of inner sleeve 47 because of the engagement of the sides thereof with the handle 57.

The provision of the extensible coupling formed by plunger rod 51 and cylinder 52 permits the miniature ship 33 to pitch and roll and this coupling with the trolley permits the ship to pitch and roll in a natural manner due to the movement of the waves 40 without restraint by the cable 35 while at the same time permitting the ship to be guided along the cable 35.

I claim:

1. A cable trolley comprising an outer member having a cylindrical bore and a longitudinal slot of a width to pass the cable laterally through said slot into and out of said bore, and a hollow cylindrical member fitting in said bore and having a similar slot, said members being relatively rotatable to align or disalign said slots, said slots being co-extensive in length with their said respective members.

2. A cable trolley according to claim 1, comprising a second slot in said outer member, and a handle on said inner member for relatively rotating said members, said handle being movable in said second slot whereby said slot limits the throw of said handle to align or disalign said cable slots.

3. Means for guiding a miniature boat on a submerged cable, said means comprising a trolley having a bore larger than the cable to receive the cable in said bore and an extensible coupling between said trolley and said boat whereby said boat may pitch and roll substantially unrestrained by said cable.

4. A cable trolley for a miniature boat comprising a pair of relatively rotatable hollow concentric members having longitudinal slots throughout the lengths thereof to pass the cable laterally through said slots when the slots are aligned.

5. A cable trolley comprising an outer member having a cylindrical bore and a longitudinal slot to pass the cable laterally through said slot into said bore, a hollow cylindrical member rotatably mounted in said bore and having a similar slot, a handle on said inner member, and a spring connected between said members for normally disaligning said slots and a stop for said handle to align said slots, said slots being co-extensive in length with their said respective members.

6. A cable trolley comprising an outer member having a longitudinally extending aperture and a longitudinal slot of a width to pass a cable transversely from the exterior of said member to said aperture, a hollow tubular member rotatably mounted in said aperture and having a slot of a width to pass said cable transversely from the exterior thereof to the interior thereof, said members being relatively rotatable to align and disalign said slots, said slots being coextensive in length with their said respective members.

7. A cable trolley for guiding a miniature model along a cable comprising a cable trolley having a bore larger than and movable along said cable, said cable extending through said bore, and a telescoping connection between said trolley and said model to permit pitching of said model toward and away from said cable while mainly restraining said model to movement in the direction of said cable.

8. A cable trolley comprising an outer member having a longitudinal bore and a longitudinal slot extending throughout the length of said member to pass the cable transversely through said slot into said bore, a hollow tubular member rotatably mounted in said bore and having a similar slot, said outer member having a second slot therein extending substantially at right angles to said first mentioned slot, and a handle on said tubular member for relatively rotating said members, said handle being movable in said last mentioned slot whereby said slot limits the throw of said handle and prevents relative longitudinal movement of said members.

9. A cable trolley according to claim 8 comprising means for normally holding sand handle at one end of the throw thereof whereby said slots are normally disaligned.

10. A cable trolley for a model comprising an outer member having a longitudinal bore and a longitudinal slot to pass a cable transversely therethrough, and a hollow tubular member mounted in said bore and having a similar slot, said members being relatively rotatable to align and disalign said slots, said outer member having the exterior thereof shaped to disguise said trolley as a part of said model, said slots being coextensive in length with their said respective members.

11. Apparatus for guiding a miniature boat through a predetermined path in water comprising the combination of a guide cable, means for supporting said cable below the boat in said path, trolleys depending fore and aft from the bottom of said boat and operatively connected to said cable, each of said trolleys comprising an extensible coupling whereby said boat may pitch substantially unrestrained by said cable and means for propelling said boat along said first mentioned cable.

12. A guide for a miniature aircraft having a body, a tail and a wing, said guide comprising cable trolleys on said wing and tail in the position of the lamps of said airplane and generally resembling said lamps.

JAMES A. GIBBONS.